(12) United States Patent
Stone

(10) Patent No.: US 8,186,961 B2
(45) Date of Patent: May 29, 2012

(54) BLADE PRELOADING SYSTEM

(75) Inventor: Paul Stone, Guelph (CA)

(73) Assignee: Pratt & Whitney Canada Corp., Longueuil (CA)

( * ) Notice: Subject to any disclaimer, the term of this patent is extended or adjusted under 35 U.S.C. 154(b) by 646 days.

(21) Appl. No.: 12/358,729

(22) Filed: Jan. 23, 2009

(65) Prior Publication Data

US 2010/0189564 A1 Jul. 29, 2010

(51) Int. Cl.
*B64C 11/04* (2006.01)

(52) U.S. Cl. ........................................... 416/221

(58) Field of Classification Search ............... 416/221, 416/241 B, 220 R, 248, 131, 204 R
See application file for complete search history.

(56) References Cited

U.S. PATENT DOCUMENTS

| 2,847,187 A | 8/1958 | Murphy |
| 3,572,970 A | 3/1971 | Smuland |
| 3,936,234 A * | 2/1976 | Tucker et al. ............. 416/220 R |
| 4,022,545 A | 5/1977 | Shank |
| 4,895,490 A | 1/1990 | Kasperski |
| 5,123,813 A | 6/1992 | Przytulski et al. |
| 5,236,309 A | 8/1993 | Van Heusden et al. |
| 5,431,543 A | 7/1995 | Brown et al. |
| 5,720,596 A | 2/1998 | Pepperman |
| 5,820,347 A | 10/1998 | Bussonnet et al. |
| 6,213,719 B1 | 4/2001 | Violette et al. |
| 6,447,253 B2 | 9/2002 | Tempere |
| 6,761,538 B2 | 7/2004 | Fitts et al. |
| 7,108,484 B2 | 9/2006 | Thenaisie et al. |
| 7,334,996 B2 | 2/2008 | Corbin et al. |

* cited by examiner

*Primary Examiner* — A. Sefer
*Assistant Examiner* — Nikolay Yushin
(74) *Attorney, Agent, or Firm* — Norton Rose Canada LLP

(57) ABSTRACT

A removable fan blade of a turbofan engine includes a blade root at one end thereof. A rotor disk has a retention slot having dimensions corresponding for receiving the root of the fan blade in the slot. An elongated resilient member extends within the retention slot in a lengthwise direction between the root of the fan blade and the bottom of the retention slot and an elongated member extends lengthwise between the root of the fan blade and the elastomeric member to compress the resilient member and provide a radial preload to the fan blade.

12 Claims, 4 Drawing Sheets

BLADE PRELOADING SYSTEM

TECHNICAL FIELD

The technical field generally relates to fan blades for use in turbofan gas turbine engines.

BACKGROUND

Rotor disks used in some turbofan engines can have blades removably mounted in circumferentially-disposed blade retention slots provided at their periphery. These blades have blade roots that are somewhat loose in their corresponding blade retention slots when the engine is shut down. However, when the engine is running rotor disk rotates at high speeds and the centrifugal force pushes the blades radially outwardly for a firm connection between the blade roots and the respective blade retention slots.

Windmilling is the passive rotation of an engine spool at very low speeds when the gas turbine engine is not operating (i.e. on the ground) in response to environmental wind blowing on the engine. The clearance between a blade root and its blade retention slot can cause the blade root to flop around in the blade retention slot. After many hours of windmilling, the mating surfaces on the blade root and the blade retention slot will be subject to wear. This wear can have a detrimental impact on the low cycle fatigue life of the rotor disk and of the blades.

It is known to provide devices to bias the blades outwardly so as to reduce blade friction wear while windmilling, but known devices are often relatively complex to assemble. Room for improvements thus exists.

SUMMARY

In one aspect, there is provided a fan blade assembly for a turbofan engine, comprising a plurality of fan blades each having a root at one end thereof, the root having a lengthwise direction and a widthwise direction, a rotor disk having a plurality of retention slots each with a lengthwise and widthwise direction corresponding to and for retaining the root of the fan blade; an elongated resilient first member extending within the retention slot in the lengthwise direction between the root of the fan blade and the bottom of the retention slot, and a second member extending lengthwise between the root of the fan blade and the first member while compressing the first member to provide a radial preload to the root of the fan blade.

In a second aspect, there is provided a fan blade assembly of a turbofan engine, comprising a fan blade having a root having a longitudinal axis and a lateral axis, a rotor disk which has a retention slot corresponding to the root of the fan blade, an elongated resilient first member insertable in the retention slot between the root of the fan blade and the bottom of the retention slot and a second member insertable between the root and the first member in a manner that the second member compresses the first member for radially preloading the fan blade in the rotor disk.

In a third aspect, there is provided a method of assembling an assembly of fan blades and a rotor disk of a turbofan engine, wherein the fan blades each include a root having a longitudinal axis and a lateral axis and the rotor disk has retention slots corresponding to the root of the fan blades, the method comprising the steps of: inserting the fan blades into the slots, inserting a first elongated member longitudinally into each retaining slot between the root of the fan blade and the bottom of the retention slot; and inserting a second elongated member between the root and the first elongated member to compress the first member in a direction of the fan blade to thereby preload the fan blade in the rotor disk in a radial outward direction.

DESCRIPTION OF THE DRAWINGS

Reference is now made to the accompanying figures, in which.

DETAILED DESCRIPTION

Figure 1:
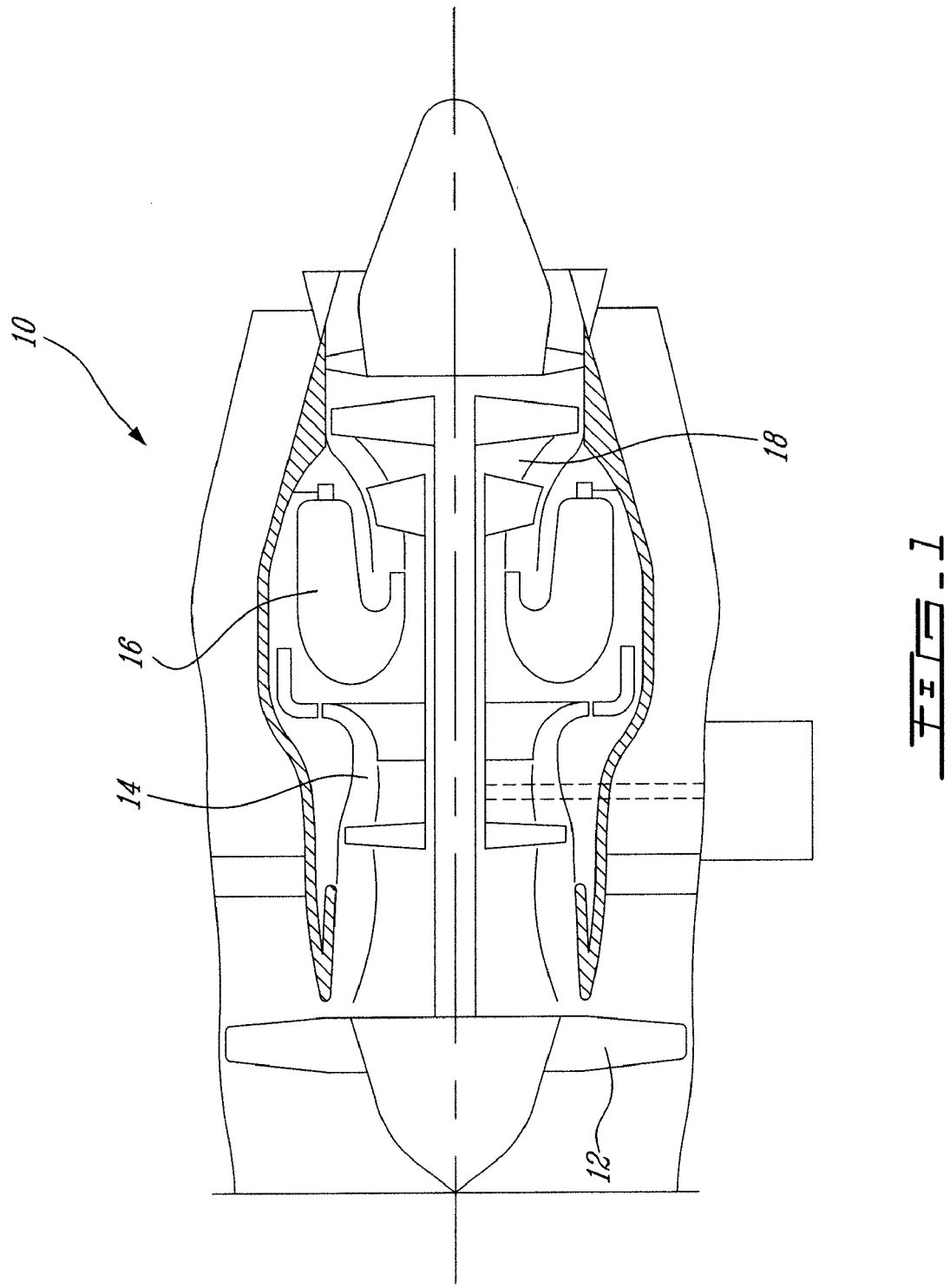
FIG. 1 is a schematic cross-sectional view of a turbofan gas turbine engine.
Figure 3:
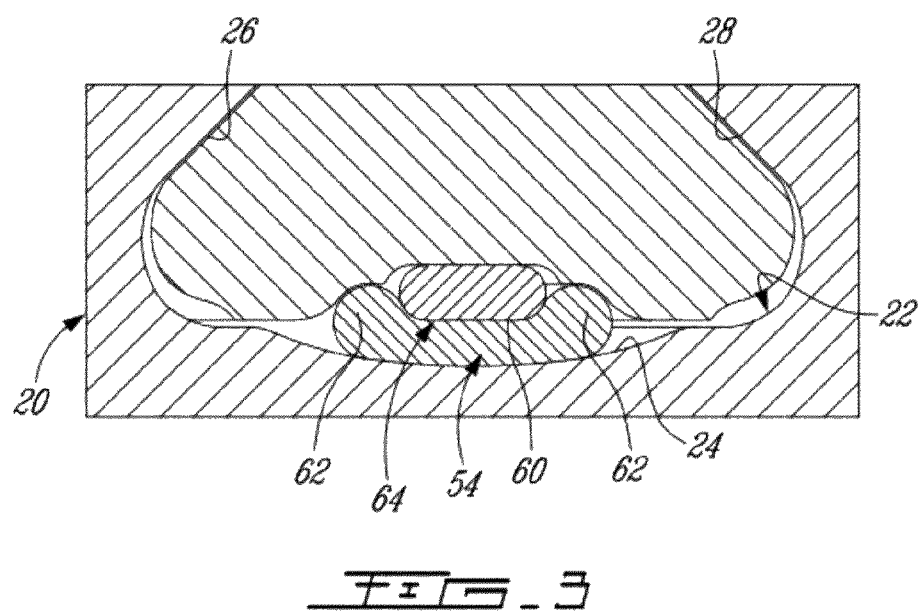
FIG. 3 is a fragmentary radial cross section showing the detail of FIG. 2.
Figure 4:
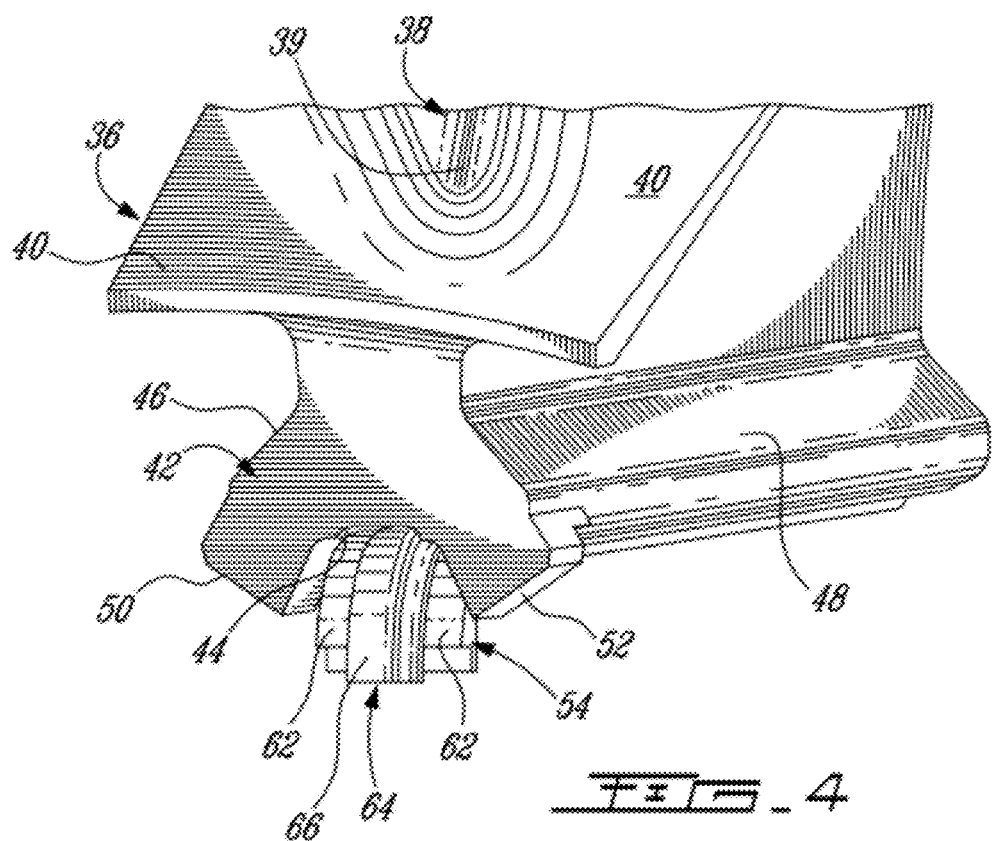
FIG. 4 is a fragmentary perspective view of the fan blade and root showing the embodiment of FIG. 2.
Figure 5:
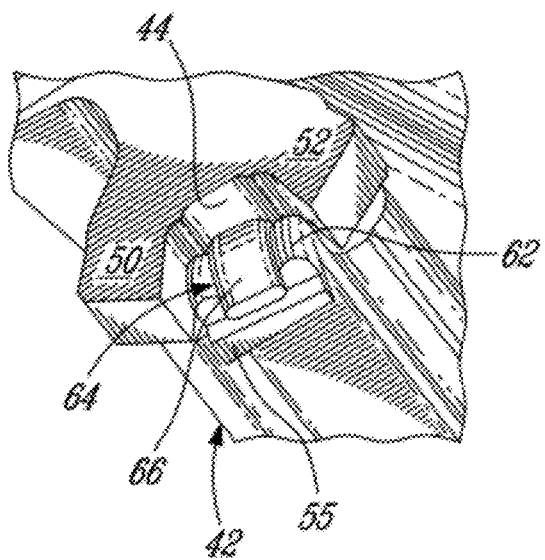
FIG. 5 is a fragmentary perspective view of the detail shown in FIG. 4 but taken from below.
Figure 6:
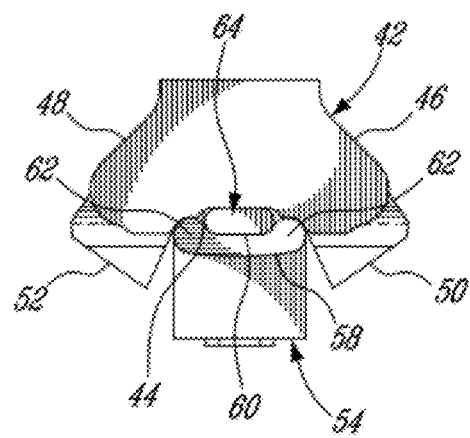
FIG. 6 is a fragmentary rear elevation of the detail shown in FIG. 4.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Referring concurrently to FIGS. 3 and 4, it can be appreciated that the fan assembly 12 includes a plurality of blades 36, each with a root 42 inserted into a corresponding slot (not indicated) on a hub 20. A blade pre-loading apparatus 54/64 is also provided, as described further below.

Figure 2:
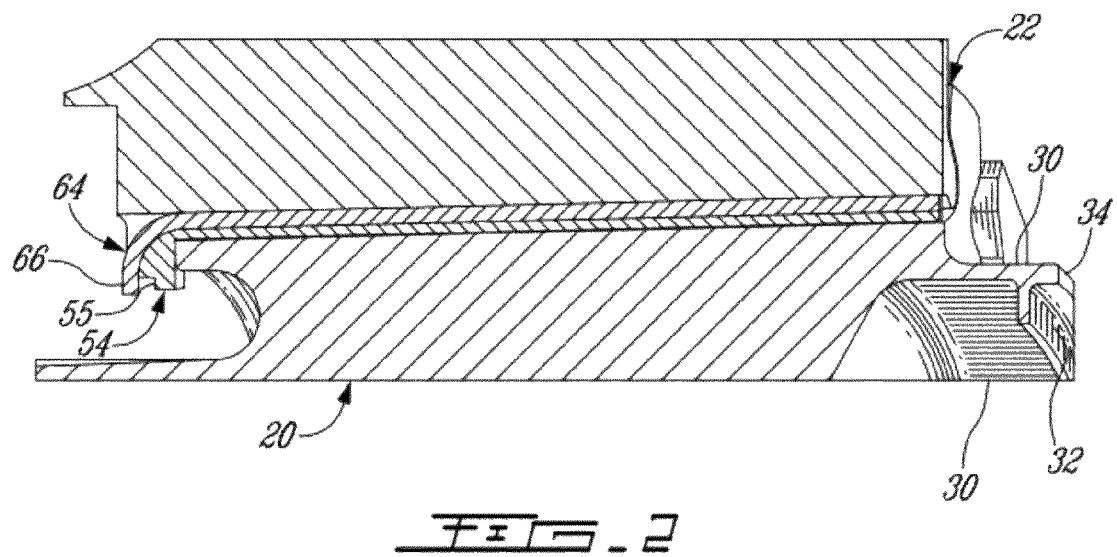
FIG. 2 is a fragmentary axial cross section showing a detail of an embodiment of the preload device.

Referring now to FIGS. 2 to 7 there is shown a portion of the rotor disk or hub 20 in which retention slots 22 are disposed somewhat axially and spaced apart circumferentially. FIGS. 2 and 3 show the retention slot 22 as having a bottom groove 24 and side walls 26 and 28. Referring to FIG. 2 there is an axial rim 30 that is concentric with the rotor disk 20. The rim 30 includes a radial flange 32 and a rim extension 34. The purpose of the rim 30 and the radial flange 32 is for anchoring weights in order to balance the rotor disk 20 with the assembled fan blades 36. The rim extension 34 acts as a support rim for the rotor disk when it is being serviced and laid on a flat surface.

The fan blade 36 is shown in FIG. 4. The fan blade 36 includes an airfoil 38 with a leading edge 39 extending above a land or platform 40. Below the land 40 is a root 42 adapted to be inserted in the retention slot 22 of the rotor disk 20. The root 42 includes a groove 44 extending longitudinally thereof. The root 42 also includes side walls 46 and 48 as well as stoppers 50 and 52 at the front end. These stoppers 50 and 52 prevent the root from sliding beyond the rear end of the retention slot 22.

Figure 7A:
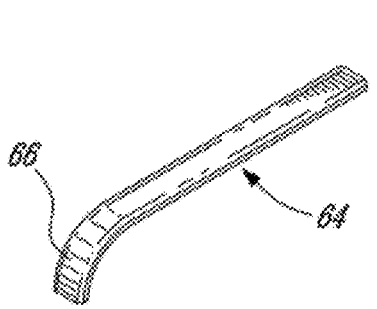
FIG. 7a is a perspective view of a further detail of FIG. 4.
Figure 7B:
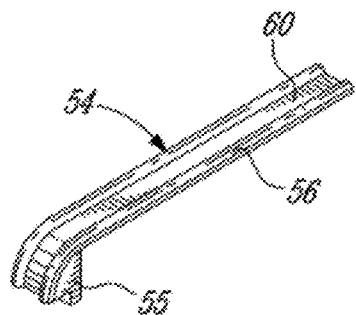
FIG. 7b is a perspective view of a still further detail of FIG. 4.

Since the root 42 fits somewhat loosely in the retention slot 22 there is a need to preload the fan blade 36 so that it does not slop around in the rotor when the engine is stopped with the aircraft on the ground. The preloading device in one embodiment includes a resilient strip which can, for instance, be made of an elastomeric material such as rubber. The strip 54 as shown in FIG. 7B includes a downward hook portion 55 at the front end thereof and a groove 60 on the top surface 56. The bottom surface 58 is at least contoured to fit in the groove 24 of the retention slot 22. The top surface of the strip 54 includes parallel lobes 62 on either side of the groove 60. The purpose of the hook portion 55, at the front end of the strip 54, is to retain the strip 54 within the groove 24 and to prevent it from sliding beyond the rear face of the rotor disk 20. The strip 54 is prevented from moving forwardly in the groove 24 by a retaining ring (not shown) which will eventually be bolted to the front of the rotor disk 20 when all the blades 36 have been loaded on the rotor. The ring will encompass the root 42 as well as the strip 54.

A further separate strip 64 is provided to function with the strip 54. The strip 64, shown in FIG. 7a, is metallic and can be produced from titanium in order to minimize corrosion. The strip 64 also has a front bend in the shape of a hook 66 for the purposes of preventing the strip 64 from moving rearwardly and also to allow a tool to grab onto the strip so that it can be removed. The retaining ring, as previously discussed, will prevent the strip 64 from moving forwardly.

Once the fan blade 36 has been mounted on the rotor disk 20 with the root 42 inserted into the retention slot 22, the strip 54 will be inserted in the clearance between the groove 44 shaped in the root 42 and the groove 24 formed in the bottom of the retention slot 22. The metal strip 64 is then inserted between the rubber strip 54 and the groove 44 of the root 42. By inserting the metal strip 64, the rubber strip 54 is compressed thereby providing radial pressure on the strip 64 and the root 42. This provides the necessary preloading of the fan blade 36 on the rotor.

Figure 7C:
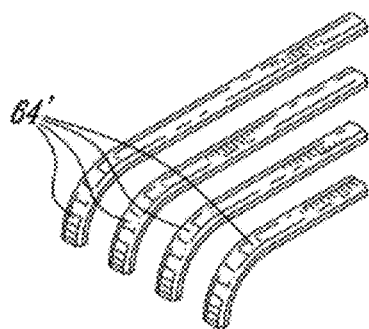
FIG. 7c is a view similar to FIG. 7a showing a set of strips of different lengths and weights that can be used to balance the fan rotor in addition of providing assistance in pre-loading the fan blades around the fan hub.

The metal strip 64 (or the resilient strips 54) can serve the further purpose of balancing the rotor disk 20 when the fan blades 36 are mounted thereon. For instance, as shown in FIG. 7c, a set of different metal strips 64' can be provided to enable the operator to place strips 64' of different weights from one fan blade to the next and thus ensure a uniform distribution of the weight around the fan rotor. These strips 64' could be of different lengths (i.e. from one blade to the next) so that the different strips have different weights and can therefore be used to balance the fan rotor assembly, thereby providing for selective balancing within the retention slot 22.

It is assumed that the rear extension 34 may be all but eliminated since the rear rim 30 and the radial flange 32 are for the purposes balancing rotor disk 20 and blades 36. All that would be retained would be a short rim extension for the purpose of laying the rotor disk on a flat surface for servicing. This would eliminate weight which compensates to a certain extent to the added weight of the strips 54 and 64.

Little or no modification may need to be done to the root 42 or the retention slot 22 to implement the present approach, relative to a traditional root/slot design. The rubber strip 54 may be made of any elastomeric or other suitably resilient material, and the density, composition, shape, etc. thereof can be selected to obtain the proper preload on the fan blade 36. The strip 64 may be made of any suitable material. The strip 64 may be flexible but its main purpose is to apply pressure on the rubber strip 54 and therefore should have enough rigidity to perform this function and allow it to be forced in after the resilient piece 54 is in place. The strip 64 could for instance be of the same material as the strip 54, but with a metal rod down its core or simply of a greater density to make it more rigid.

The rigidity of the strip 64 in the longitudinal direction is selected so that it can be forced in the slot after the resilient piece is in place.

The above description is meant to be exemplary only, and one skilled in the art will recognize that changes may be made to the embodiments described without departing from the scope of the invention disclosed. Still other modifications will be apparent to those skilled in the art, in light of a review of this disclosure, and such modifications are intended to fall within the appended claims.

What is claimed is:

1. A fan blade assembly for a turbofan engine, comprising a plurality of fan blades each having a root at one end thereof, the root having a lengthwise direction and a widthwise direction, a rotor disk having a plurality of retention slots each with a lengthwise and widthwise direction corresponding to and for retaining the root of the fan blade; an elongated resilient first member extending within the retention slot in the lengthwise direction between the root of the fan blade and the bottom of the retention slot, the elongated resilient first member being in contact with the bottom of the retention slot, and a second member separately insertable in the lengthwise direction in a gap between the root of the fan blade and the elongated resilient first member, the insertion of the second member compressing the first member to provide a radial preload to the root of the fan blade.

2. The fan blade assembly defined in claim 1 wherein the root of the fan blade includes a lengthwise groove to receive the second member and the elongated resilient first member includes a lengthwise groove in the top surface thereof to receive the second member.

3. The fan blade assembly defined in claim 1 wherein the second member is a non-corrosive metal and is selected from a set of second members of different weights that can be used to balance the rotor disk with the assembled fan blades.

4. The fan blade assembly defined in claim 1 where the second member is an elongated strip coextensive with the elongated resilient first member, the elongated resilient first member being made of an elastomeric material whereas the second member is made of a metallic material.

5. The fan blade assembly defined in claim 1 wherein the elongated resilient first member has a bent end portion at one end forming a stopper permitting the elongated resilient first member from moving rearwardly in the retention slot beyond a predetermined position.

6. The fan blade assembly defined in claim 5 wherein the second member includes a bent portion at one end thereof to act as a stopper to prevent movement of the second member beyond the rear of the rotor disk.

7. A fan blade assembly of a turbofan engine, comprising a fan blade having a root having a longitudinal axis and a lateral axis, a rotor disk which has a retention slot corresponding to the root of the fan blade, an elongated resilient first member insertable in the retention slot between the root of the fan blade and the bottom of the retention slot, and a second member separately insertable between the root and the elongated resilient first member in a manner that the second member compresses the elongated resilient first member for radially preloading the fan blade in the rotor disk, the second member being removable from the retention slot independently from the elongated resilient first member.

8. The fan blade assembly as defined in claim 7 wherein the elongated resilient first member is made of an elastomeric material and includes a bent portion at one end to form a stopper.

9. The fan blade assembly as defined in claim 7 wherein the second member is segmented into strips of different lengths to allow selective insertion of the strips for the purpose of preloading the fan blade in the rotor disk and balancing the combination of the fan blades as assembled on the rotor disk.

10. The fan blade assembly as defined in claim 7 wherein the second member is an elongated strip coextensive with the first member.

11. The fan blade assembly as defined in claim 7 wherein the second member is a metallic material that is resistant to corrosion.

12. The fan blade assembly as defined in claim 11 wherein the metallic material is titanium.

\* \* \* \* \*